(12) United States Patent
Walker

(10) Patent No.: US 10,998,587 B2
(45) Date of Patent: May 4, 2021

(54) BATTERY SYSTEM COOLING

(71) Applicant: Proterra Inc., Greenville, SC (US)

(72) Inventor: Michael C. Walker, Daly City, CA (US)

(73) Assignee: Proterra Inc., Burlingame, CA (US)

( * ) Notice: Subject to any disclaimer, the term of this patent is extended or adjusted under 35 U.S.C. 154(b) by 280 days.

(21) Appl. No.: 15/869,705

(22) Filed: Jan. 12, 2018

(65) Prior Publication Data

US 2018/0205123 A1    Jul. 19, 2018

Related U.S. Application Data

(63) Continuation of application No. 14/788,249, filed on Jun. 30, 2015, now Pat. No. 9,905,893.

(51) Int. Cl.

| H01M 10/613 | (2014.01) |
|---|---|
| H01M 10/63 | (2014.01) |
| H01M 10/6563 | (2014.01) |
| H01M 2/10 | (2006.01) |
| H01M 10/6567 | (2014.01) |
| H01M 10/61 | (2014.01) |
| H01M 10/615 | (2014.01) |
| H01M 10/625 | (2014.01) |
| B60L 58/26 | (2019.01) |
| H01M 4/485 | (2010.01) |

(52) U.S. Cl.
CPC ........... *H01M 10/613* (2015.04); *B60L 58/26* (2019.02); *H01M 2/1077* (2013.01); *H01M 10/61* (2015.04); *H01M 10/615* (2015.04); *H01M 10/625* (2015.04); *H01M 10/63* (2015.04); *H01M 10/6563* (2015.04); *H01M 10/6567* (2015.04); *H01M 4/485* (2013.01); *H01M 2220/20* (2013.01)

(58) Field of Classification Search
CPC .. H01M 10/613; H01M 10/61; H01M 10/615; H01M 10/63; B60L 58/26
See application file for complete search history.

(56) References Cited

U.S. PATENT DOCUMENTS

| 4,894,298 A * | 1/1990 | Vukson ................. H01M 10/39 429/50 |
|---|---|---|
| 8,453,773 B2 | 6/2013 | Hill et al. |
| 9,673,492 B2 * | 6/2017 | Nemesh ................ H01M 10/63 |
| 2002/0043413 A1 | 4/2002 | Kimishima et al. |
| 2012/0105001 A1 | 5/2012 | Gallegos et al. |
| 2013/0193918 A1 | 8/2013 | Sarkar et al. |
| 2013/0229153 A1 | 9/2013 | Sarkar et al. |
| 2014/0070767 A1 | 3/2014 | Morris et al. |
| 2014/0356657 A1 | 12/2014 | Yamamoto et al. |
| 2017/0038115 A1 * | 2/2017 | Goldstein ............. B65D 81/38 |

* cited by examiner

*Primary Examiner* — Ladan Mohaddes
(74) *Attorney, Agent, or Firm* — Bookoff McAndrews, PLLC

(57) ABSTRACT

An electric vehicle may include a battery system with a plurality of battery packs electrically connected together. Each battery pack of the plurality of battery packs may include a plurality of battery cells. The electric vehicle may also include a cooling system configured to cool the plurality of battery packs. The electric vehicle may further include a control system configured to selectively operate the cooling system such that at least one battery pack of the plurality of battery packs is maintained at a temperature different from another battery pack of the plurality of battery packs.

19 Claims, 4 Drawing Sheets

BATTERY SYSTEM COOLING

This application is a continuation of U.S. application Ser. No. 14/788,249, filed on Jun. 30, 2015, which is incorporated by reference in its entirely herein.

TECHNICAL FIELD

Embodiments of this disclosure relate to systems and methods for selectively cooling the battery system of an electric vehicle.

BACKGROUND

An electric vehicle (EV), also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy is stored in a battery system located in the electric vehicle. Typically, the battery system for an electric vehicle includes multiple batteries connected together. To power the electric motor and other electrical accessories of the electric vehicle, energy is discharged from the battery system. When the stored energy decreases, the battery system is charged (or recharged) by connecting the vehicle to an external or auxiliary power supply. The amount of current that may be directed into the battery system during charging, and drawn out of the battery system during discharging, depends on the specific operating conditions (e.g., temperature) of the battery system. By cooling or heating a battery relative to another battery of the battery system, the amount of current that can flow into, or from, the battery can be varied. By selectively cooling the batteries of the battery system, the current flow through the battery system can be balanced. Balanced current flow increases battery life and vehicle performance.

SUMMARY

Embodiments of the present disclosure relate to, among others, systems and methods for cooling the battery system of electric vehicles. Each of the embodiments disclosed herein may include one or more of the features described in connection with any of the other disclosed embodiments.

In one embodiment, an electric vehicle is disclosed. The electric vehicle may include a battery system with a plurality of battery packs electrically connected together. Each battery pack of the plurality of battery packs may include a plurality of battery cells. The electric vehicle may also include a cooling system configured to cool the plurality of battery packs. The electric vehicle may further include a control system configured to selectively operate the cooling system such that at least one battery pack of the plurality of battery packs is maintained at a temperature different from another battery pack of the plurality of battery packs.

In another embodiment, a method of cooling a battery system of an electric vehicle is disclosed. The battery system may include a plurality of battery packs and a cooling system. The method may include selectively operating the cooling system such that at least one battery pack of the plurality of battery packs is maintained at a temperature different from another battery pack of the plurality of battery packs.

In yet another embodiment, an electric bus is disclosed. The electric bus may include a battery system configured to provide power for propulsion of the bus. The battery system may include a plurality of battery packs electrically connected together. Each battery pack of the plurality of battery packs may include a housing enclosing a plurality of battery cells therein. The electric bus may also include a cooling system configured to cool different battery packs of the plurality of battery packs by different amounts, and a control system. The control system may be configured to selectively operate the cooling system such that a current flowing through each battery pack of the plurality of battery packs is substantially the same.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for cooling the battery system of an electric vehicle. While principles of the current disclosure are described with reference to an electric bus, it should be understood that the disclosure is not limited thereto. Rather, the systems of the present disclosure may be used to cool any battery system (of an electric vehicle, machine, tool, appliance, etc.).

Figure 1A:
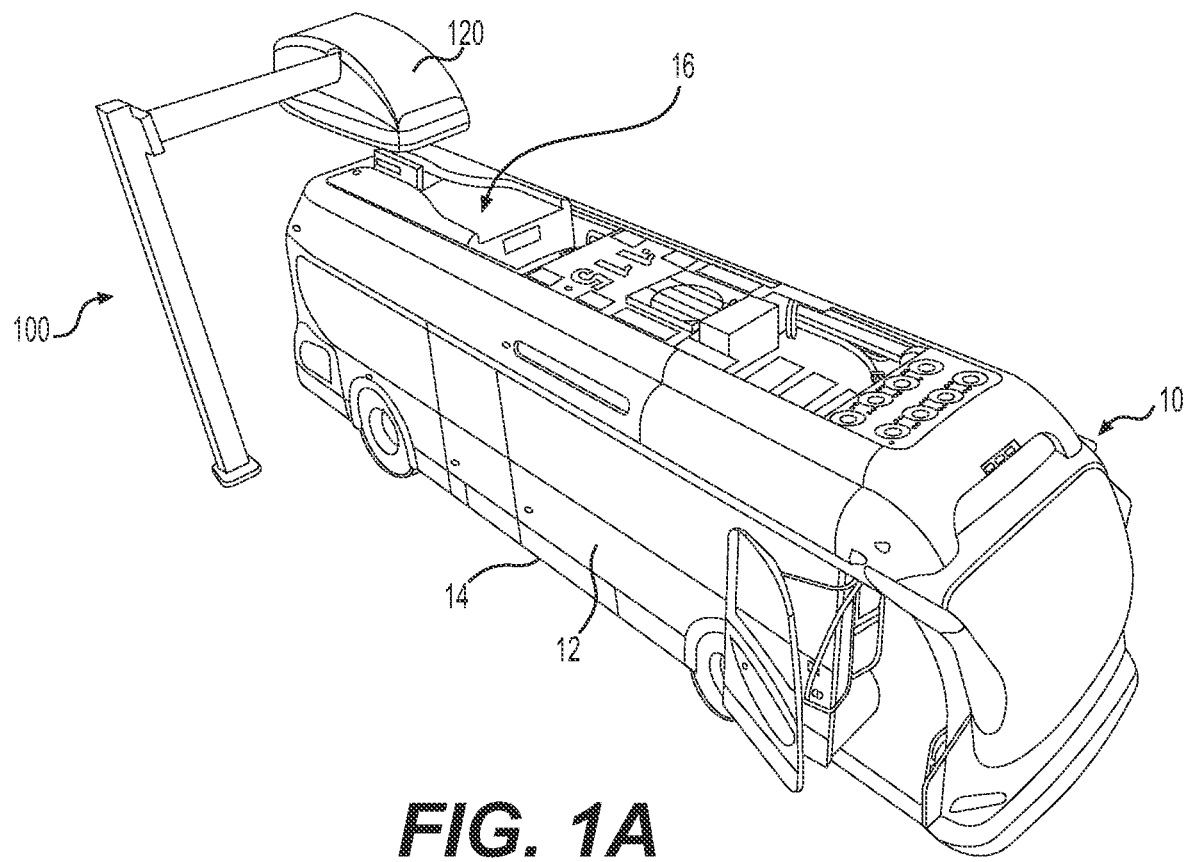
FIGS. 1A and 1B illustrate different views of an exemplary electric bus having a battery system.
Figure 1B:
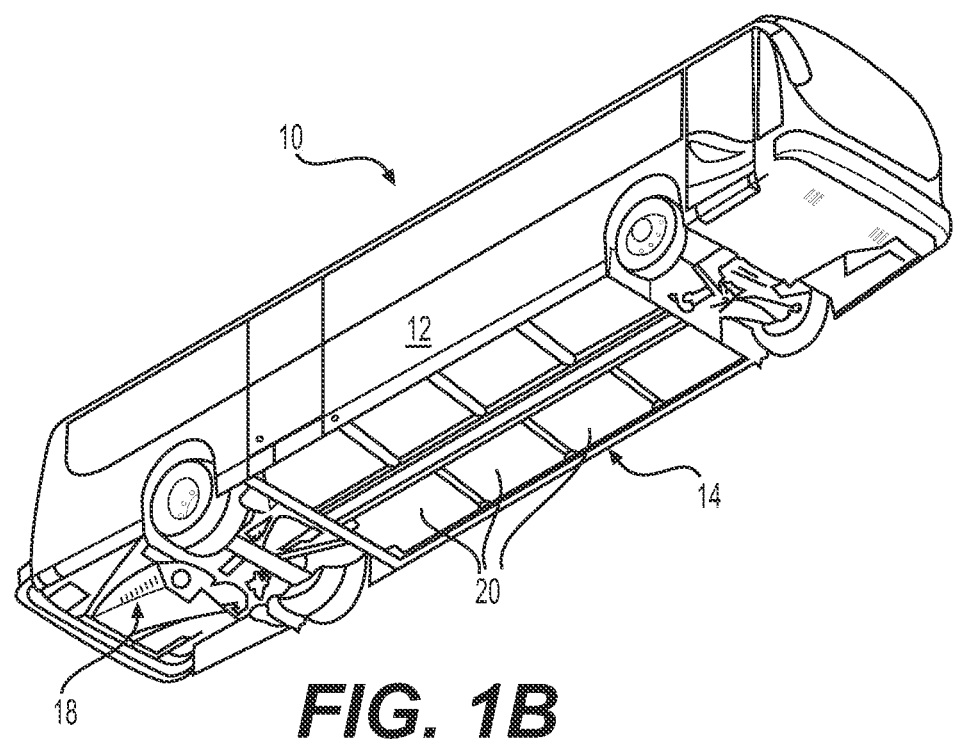

FIGS. 1A and 1B illustrate an electric vehicle in the form of an electric bus 10. FIG. 1A shows the top view of the bus 10 and FIG. 1B shows the undercarriage of the bus 10. In the discussion that follows, reference will be made to both FIGS. 1A and 1B. Bus 10 may include a body 12 enclosing a space for passengers. In some embodiments, some (or all) parts of body 12 may be fabricated using one or more composite materials to reduce the weight of the bus 10. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30-40 centimeters) from the road surface. Body 12 of bus 10 may have any size, shape, and configuration.

Bus 10 may include an electric motor 18 that generates power for propulsion. Batteries of a battery system 14 may store electrical energy to power the electric motor and other accessories (HVAC, lights, etc.). In some embodiments, as illustrated in FIG. 1B, the battery system 14 may be positioned under the floor of the bus 10. The battery system 14 may have a modular structure and may be configured as a plurality of battery packs 20. In some embodiments, each battery pack 20 may include a housing enclosing, among others, a plurality of battery modules, each having multiple battery cells. In some embodiments, the battery packs 20 may be positioned in cavities located under the floor of the bus 10. In some embodiments, as illustrated in FIG. 1B, the battery packs 20 may be arranged in two parallel columns under the floor.

Although the battery system 14 is illustrated and described as being positioned under the floor of the bus 10, this is only exemplary. In some embodiments, some or all of the battery packs 20 of the battery system 14 may be positioned elsewhere on the bus 10. For example, some of the battery packs 20 may be positioned on the roof of bus 10. As the battery system 14 may have considerable weight, placing the battery system 14 under the floor of the bus 10 may assist in keeping the center of gravity lower and balance weight distribution, thus increasing drivability and safety.

The batteries of battery system 14 may have any chemistry and construction. In some embodiments, the batteries may be lithium titanate oxide (LTO) batteries. In some embodiments, the batteries may be nickel manganese cobalt (NMC) batteries. LTO batteries may be fast charge batteries that may allow the bus 10 be recharged to substantially its full capacity in a small amount of time (e.g., about ten minutes or less). In this disclosure, the terms "about," "substantially," or "approximate" are used to indicate a potential variation of 10% of a stated value. Due to its higher charge density, NMC batteries may take longer to charge to a comparable state of charge (SOC), but NMC batteries may retain a larger amount of charge and thus increase the range of the bus 10. It is also contemplated that, in some embodiments, the batteries may include other or multiple different chemistries. For instance, some of the batteries may be LTO or NMC batteries, while other batteries may have another chemistry (for example, lead-acid, nickel cadmium, nickel metal hydride, lithium ion, zinc air, etc.). Some of the possible battery chemistries and arrangements in bus 10 are described in commonly assigned U.S. Pat. No. 8,453,773, which is incorporated herein by reference in its entirety.

By virtue of its chemistry, some batteries (e.g., lithium batteries such as LTO and NMC batteries) exhibit a negative impedance response with temperature. In batteries with a negative impedance response with temperature, the impedance of the battery decreases with increasing temperature. Current flow (both during charging and discharging) through a battery is inversely proportional to the battery impedance. That is, current flow through a battery decreases as its impedance increases. Therefore, in LTO and NMC batteries, the battery impedance decreases, and current flow through the battery increases, as the temperature of the battery increases. It should be noted that, in batteries that have a positive impedance response with temperature, the battery impedance increases, and the current flow through the battery decreases, as the battery temperature increases.

A charging interface 16 may be provided on the roof of the bus 10 to charge the batteries of the battery system 14. The charging interface 16 may engage with the charging head 120 of an external charging station 100 to charge the batteries of the battery system 14. During charging, when the bus 10 is positioned under the overhanging charging head 120, the charging head 120 may descend to land on and engage with the charging interface 16. Details of the charging head 120 and the interfacing of the charging head 120 with the charging interface 16 of the bus 10 are described in commonly assigned U.S. Patent Application Publication Nos. US 2013/0193918 A1 and US 2014/0070767 A1, which are incorporated by reference in their entirety herein.

Figure 2:
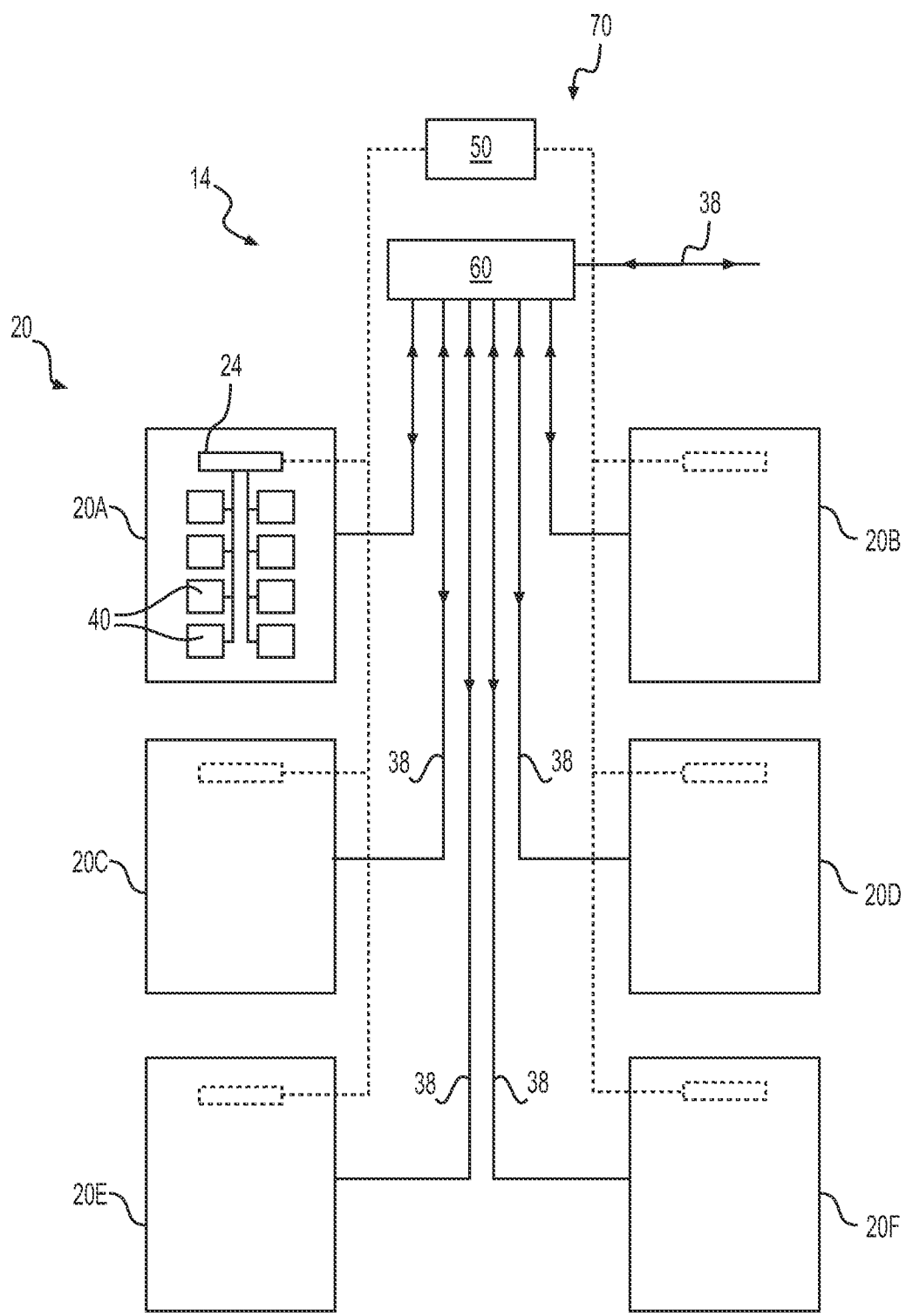
FIG. 2 illustrates an exemplary configuration of the battery system of the bus of FIG. 1A.

FIG. 2 illustrates an exemplary configuration of the battery system 14 of bus 10. In general, battery system 14 may include a plurality of battery packs 20 connected together in series or in parallel. FIG. 2 illustrates six battery packs 20A, 20B, 20C, 20D, 20E, and 20F (collectively referred to as battery packs 20) electrically connected to a junction 60 in parallel. As shown in the illustration of battery pack 20A of FIG. 2, each battery pack 20 may include a plurality of battery modules 40. Each battery module 40 may include an enclosure that houses a plurality of battery cells (connected in series or parallel). The plurality of battery modules 40 may be connected together in series or parallel. In some embodiments, some of the battery modules 40 may be connected together in series while other battery modules 40 may be connected together in parallel. For example, the exemplary illustration of battery pack 20A shows eight battery modules 40 arranged in two columns of four battery modules 40. The four battery modules 40 in each column may be connected together in series and the two columns of battery modules 40 may be connected together in parallel. Each battery module 40 may include a plurality of battery cells (e.g., LTO or NMC cells) connected together in series.

Although not a requirement, in some embodiments, the battery packs 20 of battery system 14 may be substantially identical (in terms of number of modules 40, how the modules are connected, etc.) to each other. Although FIG. 2 illustrates the battery packs 20 as being connected together in parallel, in some embodiments, some battery packs 20 may be connected together in series to form strings of battery packs (e.g., battery packs 20A, 20C, and 20E connected together in series to form a first string, and battery packs 20B, 20D, and 20F connected together in series to form a second string). In some embodiments, battery system 14 may include a plurality of strings of battery packs 20 connected in parallel (e.g., first string and second string connected together in parallel). Configuring the battery system 14 as with battery packs 20 connected in parallel may allow the bus 10 to continue operating with one or more battery packs 20 disconnected if these battery packs 20 (or the modules/cells within the battery packs) fail or experience a problem.

In battery system 14, bus bars 38 connect each battery pack 20 to the electrical system of bus 10 through a junction 60. The junction 60 may direct power to the battery system 14 during charging and direct power from the battery system 14 during discharging. The junction 60 may include electrical components (not shown) configured to selectively connect and disconnect one or more battery packs 20 of battery system 14. That is, if one of the battery packs 20 experiences a problem, this battery pack 20 may be disconnected at junction 60 to allow the bus to continue operating with the remaining battery packs 20. Bus bars 38 may include an electrically conductive material (copper, aluminum, etc.) arranged in any configuration (wire, strip, rod, bar, etc.). In some embodiments, as illustrated in FIG. 1B, the battery packs 20 (and other components) of the battery system 14 may be arranged in a single layer on a common horizontal plane to decrease its height so that it may be positioned under the floor of the low-floor bus 10. The low height profile of the battery system 14 may make the battery system 14 more aerodynamic, while increasing its surface area for heat dissipation.

Due to the compact arrangement of the battery packs 20 in bus 10, the bus bars 38 that connect some of the battery packs 20 to junction 60 may be longer than the bus bars 38 that connect other battery packs 20 to junction 60. For example, in the battery system 14 illustrated in FIG. 2, the bus bars 38 that connect battery packs 20E and 20F to junction 60 is longer than the bus bars 30 that connect battery packs 20C and 20D to junction 60. And, the bus bars 30 that connect battery packs 20C and 20D to junction 60 are longer than the bus bars 38 that connect battery packs 20A and 20B to junction 60. In other words, battery packs 20E and 20F are electrically further away from junction 60 than battery packs 20C and 20D and battery packs 20A and 20B. Increasing the length of a bus bar 38 increases the impedance of (i.e., resistance to current flow through) the bus bar 38. Therefore, battery packs 20 that are electrically further away from junction 60 may have a greater effective impedance than the battery packs 20 that are closer to junction 60. It should be noted that, even if battery packs 20E and 20A may themselves have the same impedance (because of the type of cells, etc.), because the bus bars that connect these battery packs to junction 60 have different impedances, effectively, the battery packs 20E and 20A appear to have a different impedances. The phrase effective impedance is used to refer to the total impedance of a battery pack and the bus bar that connects the battery pack to a common point (e.g., junction 60).

Current preferentially flows to (and from) battery packs 20 having a lower impedance than battery packs 20 having a higher impedance. Consequently, more current will be drawn during discharging, and directed to during charging, from/to battery packs 20A and 20B as compared to other battery packs (e.g., battery packs 20E and 20F) of battery system 14. Increased current flow through a battery pack 20 increases the temperature of the battery pack 20. Therefore, in battery system 14, battery packs 20 that are electrically closer to junction 60 may experience more current flow, and operate at a higher temperature than, batteries electrically further away from junction 60. If the cells of these battery packs 20 are made of a material having a negative impedance response with temperature, the impedance of the battery packs 20 decrease with temperature and current flow from these battery packs 20 increase further. Increased current flow from selected battery packs 20 of battery system 14 as compared to the other battery packs 20 may create an imbalance in the current flow, and in some cases, decrease the life of the battery system 14.

Battery system 14 may include a battery management system (BMS). Some possible embodiments of a BMS that may be used in bus 10 are described in commonly-assigned U.S. Patent Application Publication No. US 2012/0105001 A1, which is incorporated by reference in its entirety herein. The BMS may control the operations of battery system 14. The BMS may include different levels of controllers that control the operation of battery system 14 based on sensor input and/or variables programmed into these controllers. These controllers may include a module control unit (not shown) provided in each module 40 of the battery packs 20, a pack control unit 24 provided in each battery pack 20, and a master control unit 50 for the battery system 14. The module control unit may control the operations of each module 40 in coordination with the pack and master control units 24, 50. The pack control unit 24 may control the operations of each battery pack 20 in coordination with the master control unit 50, and the master control unit 50 may control the operations of the battery system 14 alone or in coordination with other controllers of bus 10 (e.g., a vehicle control unit).

In this disclosure, the controllers (including module control unit, pack control unit 24, master control unit 50, vehicle control unit, etc.) that control the operation of the battery system 14 are collectively referred to as a control system 70. Control system 70 may include a collection of mechanical, electrical, and electronic devices (for example, computational units, A/D converters, memory, switch, valves, actuators, fuses, etc.) that collectively perform the functions of control system 70. In addition to controlling the operations of battery system 14, control system 70 may also control other operations of the bus 10 (for example, HVAC control, door opening/closing, kneeling, etc.).

Based on input from sensors (e.g., current, voltage, and temperature transducers, etc.) provided in battery system 14, the control system 70 may selectively control the operation of different battery packs 20. For example, based on sensor inputs that indicate that one of the battery modules 40 has failed, the control system 70 may disconnect a battery pack 20 that includes the failed battery module 40. In some embodiments, based on the temperature and/or current flow through the different battery packs 20 of battery system 14, the control system 70 may selectively adjust the cooling of the different battery packs 20. For example, the control system 70 may adjust the cooling of different battery packs 20 in the battery system 14 to selectively change the impedance of selected battery packs 20 in the battery system 14 (e.g., to counteract the change in impedance due to other factors) to make the current flow through all the battery packs 20 to be substantially the same. That is, the control system 70 may selectively adjust the cooling of different battery packs 20 in battery system 14 to balance the current flow through the battery system 14. Balancing the current flow may ensure that substantially the same amount of current flows through each battery pack 20 of the battery system 14. A balanced current flow may increase the life of the battery system 14.

In the embodiment of battery system 14 illustrated in FIG. 2, the control system 70 may cool battery packs 20A and 20B differently than battery packs 20E and 20F to increase the impedance of battery packs 20A and 20B compared to battery packs 20E and 20F. As explained previously, in battery cells having a negative impedance response with temperature (e.g., LTO and NMC battery packs), increase in temperature decreases its impedance and increases the current flow through the battery pack 20. Therefore, if the battery system 14 includes all battery cells with a negative impedance response with temperature, control system 70 may adjust the cooling of the battery system 14 such that battery packs 20A and 20B are cooled more than battery packs 20E and 20F. Cooling battery packs 20A and 20B more than battery packs 20E and 20F decreases the temperature of battery packs 20A and 20B as compared to battery packs 20E and 20F, and therefore, increases the impedance of battery packs 20A and 20B as compared to battery packs 20E and 20F.

It should be noted that, if the battery system 14 of FIG. 2 includes all battery cells with a positive impedance response with temperature, control system 70 may adjust the cooling of the battery system 14 such that battery packs 20E and 20F are cooled more than battery packs 20A and 20B. Cooling battery packs 20E and 20F more than battery packs 20A and 20B increases the temperature of battery packs 20A and 20B as compared to battery packs 20E and 20F, and therefore, increases the impedance of battery packs 20A and 20B as compared to battery packs 20E and 20F. Control system 70 may control the cooling such that the temperature that results from the changed cooling does not exceed (or decrease beyond) a predetermined threshold temperature. In general, the control system 70 may adjust the cooling of the different battery packs 20 in a battery system 14 such that the change in impedance caused by their relative location in the battery system 14 is counteracted by the change in impedance caused by the different cooling.

In some embodiments, the control system 70 may be preprogrammed to cool the battery packs 20 of a battery system 14 based on their relative location in the battery system 14. That is, the control system 70 may cool the different battery packs 20 such that the change in impedance caused by their relative location is counteracted by the change in impedance caused by the different cooling. For instance, in battery systems 14 with batteries having a negative impedance response with temperature, the control system 70 may increase the cooling of the battery packs 20 that are electrically closer to a junction (that connects all the battery packs) relative to the other battery packs. The desired cooling pattern may be programmed in the control system 70 by, for example, programming different set point temperatures for different battery packs 20 based on their relative location in the battery system 14. For example, a lower set point temperature may be set for closer battery packs 20 and a higher set point temperature may be set for battery packs 20 further away. The control system 70 may then control the cooling of the battery system 14 to maintain the different battery packs 20 at their preprogrammed set point temperatures.

Figure 3:
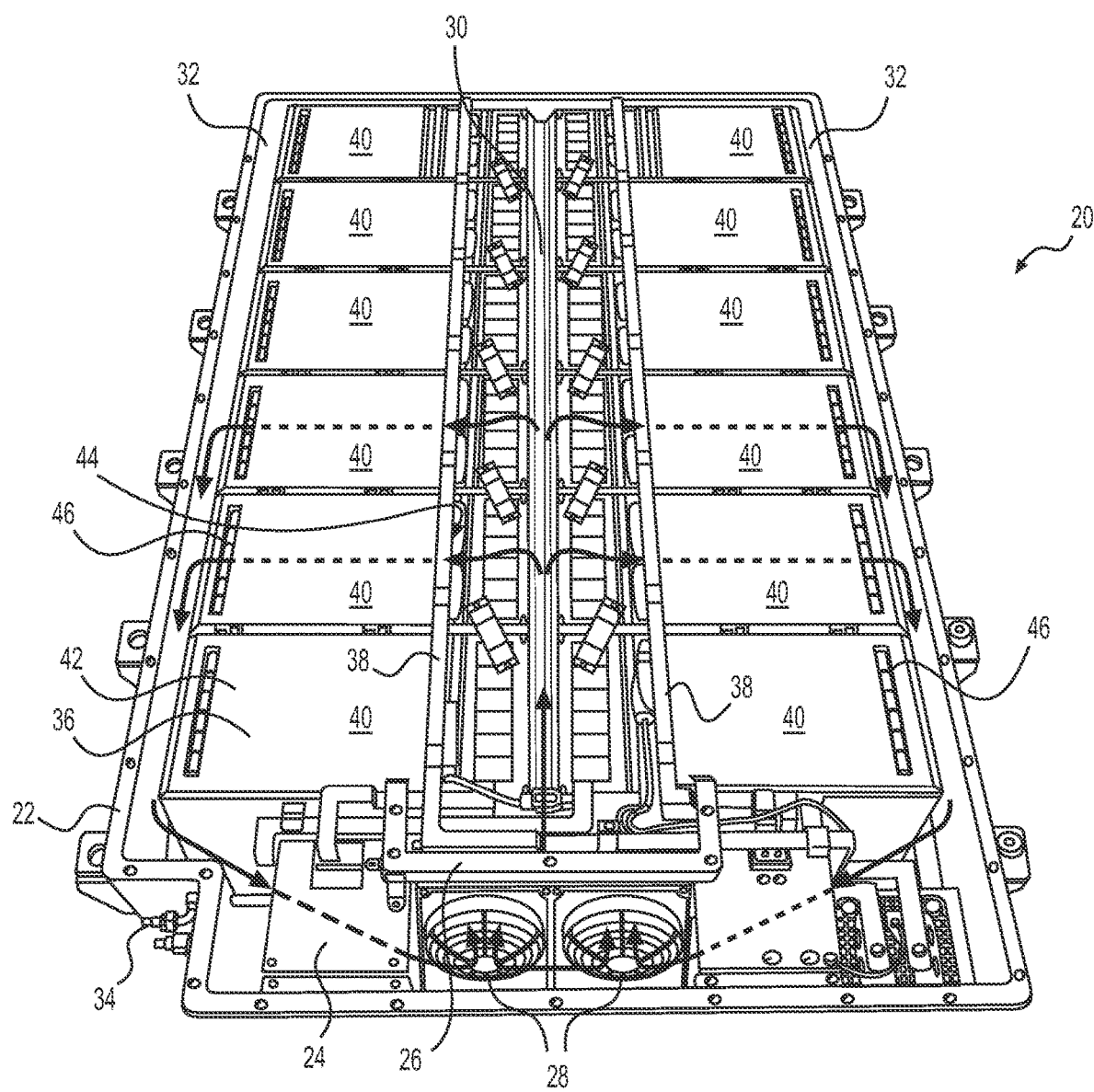
FIG. 3 illustrates an exemplary battery pack of the battery system of FIG. 2.

FIG. 3 illustrates an exemplary battery pack 20 of battery system 14 having a cooling system that may be controlled by control system 70. Battery pack 20 may have a protective housing 22 which encloses battery modules 40 of the battery pack 20 under a lid (not shown). In FIG. 3, the lid of the housing 22 is removed to show the components within the housing 22. The housing 22 may protect the battery modules 40 from the atmosphere (e.g., dirt and grime from the road surface). The bus bars 38 of battery system 14 may extend into the battery pack 20 to electrically connect the battery modules 40 of the battery pack 20. Electrical current to and from the battery modules 40 may flow through the bus bars 38. In this disclosure, the phrase current flow through the battery pack is used to refer to both current flow from the battery pack 20 (i.e., discharging), and current flow into the battery pack 20 (i.e., charging). Housing 22 may also include the pack control unit 24 that controls the operations of the battery pack 20, and sensors that measure the operating conditions and current flow through the battery pack 20. In some embodiments, temperature sensors 36 may be provided in each module 40 of the battery pack 20 and the pack control unit 24 may use an average temperature of some or all of the temperature sensors 36 as the temperature of the battery pack 20. Alternatively, in some embodiments, a battery pack 20 may have only one temperature sensor 36. The current and voltage sensors (not shown) may be electrically coupled to the bus bar 38 to measure the parameters of the current flowing through the battery pack 20. Housing 22 may also include a cooling system.

The cooling system may include one or more liquid-to-air heat exchangers 26 (or liquid-cooled cold plate) to cool air in the housing 22, and one or more fans 28 (or other air circulating devices) to circulate the cooled air in the battery pack 20. The housing 22 may include an air channel 30 that directs cool air from the fans 28 through each of the battery modules 40 to cool the battery cells enclosed therein. Cool air from the air channel 30 may flow into the enclosure 42 of a battery module 40 (as shown by arrows in FIG. 3) through an inlet vent 44 to cool battery cells (and other components) in the battery module 40, and exit the enclosure 42 through an outlet vent 46 into an air return channel 32. The air return channel 32 may direct the warmed exhaust air through the heat exchanger 26 to cool the air and circulate it back through the modules 40.

A liquid coolant may be directed into the heat exchanger 26 through coolant lines 34 to remove heat from the air circulating in the battery pack 20. The coolant lines 34 of all the battery packs 20 of the battery system 14 may be supplied with coolant from a liquid cooling system of the bus 10. Although the heat exchanger 26 and the fans 28 are illustrated as being positioned in the housing 22, this is only exemplary. In some embodiments, one or both of the heat exchanger 26 and the fans 28 may be positioned external to the housing 22. In such embodiments, the air from the housing 22 may be transported to the external heat exchanger 26 for cooling. To control the cooling of battery pack 20, the control system 70 may vary the flow of liquid coolant (flow rate, etc.) through the heat exchanger 26 to vary temperature of the air in the battery pack 20 and/or vary the speed of the fans 28 to vary the rate of air flow in the battery pack 20.

It should be noted that the structure of the battery system 14 and battery pack 20 described above are only exemplary. In general, the disclosed battery cooling method may be applied to any type of battery system 14. For instance, in some embodiments, separate heat exchangers may not be associated with each battery pack. Instead, a single heat exchanger may cool the coolant (liquid or air) directed to different battery packs 20 of the battery system 14. The control system 70 may selectively cool the battery packs 20 of such a battery system 14 by controlling the flow of the coolant to different battery packs 20.

Figure 4:
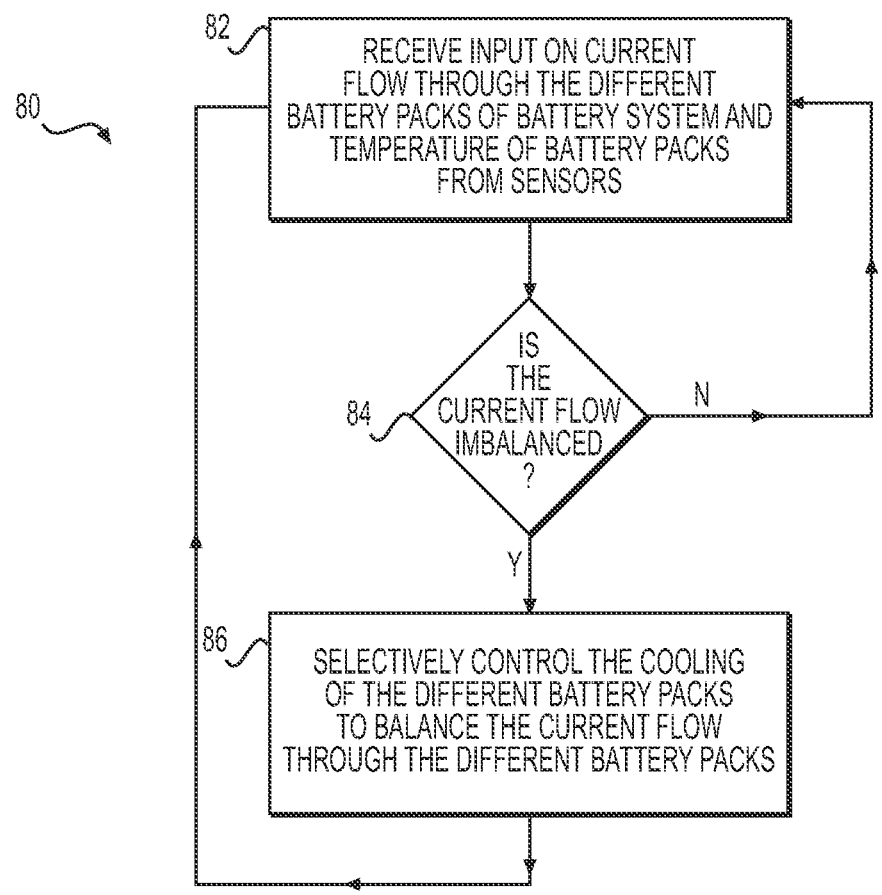
FIG. 4 illustrates an exemplary method of cooling the battery system of FIG. 2.

In some embodiments, the control system 70 may selectively control the cooling of the battery packs 20 of battery system 14 based on input from sensors of battery system 14 (e.g., sensors in the battery packs 20 and/or other sensors). FIG. 4 is a flow chart that illustrates an exemplary method 80 used by control system 70 to control the cooling of the battery packs 20. During operation of the bus 10, control system 70 may receive input from the sensors of the battery system 14. This input may include input on the current flow through the different battery packs 20 of the battery system 14 and the temperature of the battery packs 20 in the battery system 14 (step 82). Based on this input, the control system 70 may determine if there is an imbalance in the current flow through the different battery packs 20 in the battery system 14 (step 84). For example, the control system 70 may determine if current flow through some of the battery packs 20 is more than others (step 84). If the control system 70 determines that the current flow is substantially uniform or balanced, the control system 70 may continue to monitor the sensor input for current imbalance. If the control system 70 detects a current imbalance, the control system 70 may selectively control the cooling of the different battery packs 20 of the battery system 14 (step 86) until the current flow through the different battery packs 20 become substantially balanced.

That is, the control system 70 may increase or decrease the cooling of some battery packs 20 relative to the other battery packs 20 until the current flow through each battery pack 20 becomes substantially the same. In embodiments, where the battery system 14 includes batteries having a negative impedance response with temperature, the control system 70 may increase the cooling of battery packs 20 that have an increased current flow relative to the other battery packs 20. In some embodiments, the cooling of battery packs may only be changed such that the temperature of the battery packs 20 do not increase and/or decrease beyond predetermined threshold values. Balancing the current flow in the battery system 14 may make the current flow through all the battery packs 20 in the battery system 14 to be substantially equal, and thereby increase the life and reliability of the battery pack 20.

While principles of the present disclosure are described herein with reference to a battery cooling system for an electric bus, it should be understood that the disclosure is not limited thereto. Rather, the systems described herein may be employed to cool the batteries in any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A method of cooling a battery system of an electric vehicle, the battery system including a plurality of battery packs and a cooling system, comprising:
    selectively operating the cooling system such that at least one battery pack of the plurality of battery packs is maintained at a temperature different from another battery pack of the plurality of battery packs.

2. The method of claim 1, further including determining operating parameters of each battery pack of the plurality of battery packs, wherein selectively operating the cooling system includes controlling the cooling of each battery pack based on the determined operating parameters of the battery pack.

3. The method of claim 1, wherein selectively operating the cooling system includes controlling the cooling of each battery pack of the plurality of battery packs based on an effective impedance of the battery pack.

4. The method of claim 1, wherein selectively operating the cooling system includes controlling the cooling of each battery pack of the plurality of battery packs such that a current flowing through each battery pack is substantially the same.

5. The method of claim 1, further including preprogramming set point temperatures for each battery pack of the plurality of battery packs, wherein the programmed set point temperature of a first battery pack of the plurality of battery packs is different from the programmed set point temperature of a second battery pack of the plurality of battery packs.

6. The method of claim 5, wherein selectively operating the cooling system includes increasing a cooling of the first battery pack relative to the second battery pack.

7. The method of claim 6, wherein increasing the cooling of the first battery pack includes increasing a flow rate of a liquid coolant through the first battery pack.

8. The method of claim 6, wherein increasing the cooling of the first battery pack includes increasing a rate of air flow in the first battery pack.

9. The method of claim 1, wherein the plurality of battery packs includes a first battery pack and a second battery pack, and wherein selectively operating the cooling system includes cooling the first battery pack to a first set point temperature and cooling the second battery pack to a second set point temperature different from the first set point temperature.

10. A method of cooling a battery system of an electric vehicle, the battery system including a plurality of battery packs and a cooling system, comprising:
    receiving, at a controller, input from first and second battery packs of the plurality of battery packs;
    determining, based on the received input, a difference in current flow through the first and second battery packs; and
    operating the cooling system to reduce the difference in the current flow by establishing a set point temperature of a first battery pack of the plurality of battery packs different from a set point temperature of a second battery pack of the plurality of battery packs.

11. The method of claim 10, wherein selectively operating the cooling system includes increasing a cooling of the first battery pack relative to the second battery pack.

12. The method of claim 11, wherein increasing the cooling of the first battery pack includes increasing a flow rate of a liquid coolant through the first battery pack.

13. The method of claim 11, wherein increasing the cooling of the first battery pack includes increasing a rate of air flow in the first battery pack.

14. A method of cooling a battery system of an electric vehicle, the battery system including a plurality of battery packs and a cooling system, comprising:
    setting, in a controller, a first set point temperature for a first battery pack of the plurality of battery packs and a second set point temperature, different from the first set point temperature, for a second battery pack of the plurality of battery packs; and
    operating the cooling system such that the first battery pack is cooled to the first set point temperature and the second battery pack is cooled to the second set point temperature.

15. The method of claim 14, wherein the setting includes setting set point temperatures for different battery packs of the plurality of battery packs based on an effective impedance of the different battery packs.

16. The method of claim 14, further including receiving, at the controller, inputs from the first and second battery packs, the inputs being indicative of a current flow through the first and second battery packs.

17. The method of claim 16, further including determining a difference in current flow through the first and second battery packs based on the received inputs.

18. The method of claim 17, further including selecting the first and second set point temperatures to reduce the difference in current flow through the first and second battery packs.

19. The method of claim 14, wherein operating the cooling system includes clanging flow of a coolant in the first battery pack relative to the second battery pack.

* * * * *